United States Patent
Houze

(10) Patent No.: US 10,536,503 B2
(45) Date of Patent: Jan. 14, 2020

(54) PROCESSING OF A REQUEST FOR DATA DELIVERY FROM A SERVER TO A CLIENT VIA A TELECOMMUNICATION NETWORK

(71) Applicant: B<>COM, Cesson Sevigne (FR)

(72) Inventor: Patrice Houze, Rennes (FR)

(73) Assignee: B<>COM, Cesson Sevigne (FR)

( * ) Notice: Subject to any disclaimer, the term of this patent is extended or adjusted under 35 U.S.C. 154(b) by 181 days.

(21) Appl. No.: 15/527,979

(22) PCT Filed: Nov. 26, 2015

(86) PCT No.: PCT/FR2015/053216
§ 371 (c)(1),
(2) Date: May 18, 2017

(87) PCT Pub. No.: WO2016/083740
PCT Pub. Date: Jun. 2, 2016

(65) Prior Publication Data
US 2017/0331875 A1 Nov. 16, 2017

(30) Foreign Application Priority Data
Nov. 28, 2014 (FR) ...................................... 14 61650

(51) Int. Cl.
*H04L 29/06* (2006.01)
(52) U.S. Cl.
CPC .......... *H04L 65/608* (2013.01); *H04L 65/602* (2013.01); *H04L 65/80* (2013.01); *H04L 29/06* (2013.01)
(58) Field of Classification Search
None
See application file for complete search history.

(56) References Cited

U.S. PATENT DOCUMENTS

| | | | | |
|---|---|---|---|---|
| 2008/0256326 A1* | 10/2008 | Patterson | .............. | G06F 3/0644 711/206 |
| 2015/0032899 A1* | 1/2015 | Willars | ............... | H04L 65/4076 709/231 |
| 2015/0365450 A1* | 12/2015 | Gaunt | ................. | H04L 65/4084 709/231 |

FOREIGN PATENT DOCUMENTS

| | | |
|---|---|---|
| EP | 2613543 A2 | 7/2013 |
| EP | 2704449 A1 | 3/2014 |
| WO | 2014096463 A1 | 6/2014 |

OTHER PUBLICATIONS

International Search Report with English Translation dated Feb. 8, 2016 for International Application No. PCT/FR2015/053216, filed Nov. 26, 2015.

(Continued)

*Primary Examiner* — James A Edwards
(74) *Attorney, Agent, or Firm* — David D. Brush; Westman, Champlin & Koehler, P.A.

(57) ABSTRACT

Processing a request for delivery of data sent by a customer terminal to a remote server via a telecommunication network. The terminal accesses the network by at least two links of distinct access types. The data is encoded in a stream with a predetermined bit rate, which is cut into segments. Processing includes, for a segment of the stream: determining a sub-segment size based on the number of links and a size of the data stream to be delivered; calculating a partitioning of the segment into sub-segments according to the set size and a distribution of the sub-segments on the plurality of links, according to a scheduling of the sub-segments in the partitioning and a time constraint; and sending a plurality of sub-segment transmission requests to the server over the plurality of links, each request including an identifier of the segment and indexes of a sub-segment start and end.

12 Claims, 9 Drawing Sheets

(56) References Cited

OTHER PUBLICATIONS

Written Opinion of the International Searching Authority dated Feb. 8, 2016 for International Application No. PCT/FR2015/053216, filed Nov. 26, 2015.

Thomas Stockhammer, "Dynamic Adaptive Streaming over http—Standards and Design Principles" published in the Proceedings of the ACM Conference on Multimedia Systems, in Feb. 2011, pp. 133-144.

English translation of the Written Opinion of the International Searching Authority dated Apr. 3, 2017, for International Application No. PCT/FR2015/053216, filed Nov. 26, 2015.

* cited by examiner

PROCESSING OF A REQUEST FOR DATA DELIVERY FROM A SERVER TO A CLIENT VIA A TELECOMMUNICATION NETWORK

1. CROSS-REFERENCE TO RELATED APPLICATIONS

This application is a Section 371 National Stage Application of International Application No. PCT/FR2015/053216, filed Nov. 26, 2015, the content of which is incorporated herein by reference in its entirety, and published as WO 2016/083740 on Jun. 2, 2016, not in English.

2. FIELD OF THE INVENTION

The field of the invention is that of the delivery of data from a server to a client via at least one telecommunication network.

The invention may in particular, but not exclusively, apply to the delivery of multimedia data streams according to an "http adaptive streaming" type technology.

3. PRESENTATION OF THE RELATED ART

It is known from the MPEG-DASH (for "Dynamic Adaptive Streaming over http") a technique for delivering multimedia data by a Hypertext Transfer Protocol (HTTP) server equipment to a client equipment DASH, wherein multimedia data are cut into segments, which are encoded at a plurality of bit rate values. This technique is described in particular in the article entitled «Dynamic Adaptive Streaming over http-Standards and Design Principles», by Thomas Stockhammer, published in the Proceedings of the «ACM Conference on Multimedia Systems, in February 2011, pages 133-144.

In connection with FIG. 1, the customer equipment DASH UE connects to the server equipment ES via a communication network RT. The server equipment ES has several data files F1, F2, F3, . . . FN therefore corresponding to the same segment, encoded at different qualities. The client equipment DASH which wishes to receive the multimedia data streams begins by requesting the server equipment to transmit to it a MPD type description file (for "Media Presentation Description") of the multimedia data. This file describes in particular the files corresponding to the segments available at the server equipment and their associated data rate. The client uses the description data of this file to determine, for each segment, the file that corresponds to the bit rate of his choice, as a function of the bandwidth at a given instant and to define the delivery request to be sent to the server equipment.

A first advantage of this technique is that it is simple. The fact of being based on the http protocol solves the problem of going through firewalls and the server equipment consists of a generic WEB server, inexpensive and easy to deploy on a large scale.

A second advantage of this technique is that it is adaptive. The client equipment adapts its request to the available bandwidth by choosing a segment encoded at a higher or lower bit rate. For example, the client equipment first requests delivery of high bit rate files for the first segments, and then switches to lower bit rate files for subsequent segments when it encounters a momentary bandwidth problem.

A first shortcoming of this technique lies in the large size of the segments available at the server, which corresponds, in the case of a video sequence, to a duration comprised between 3 and 10 seconds. When the network conditions are not optimal, its transmission may be delayed or show a latency which is not compatible with real-time constraints.

A shortcoming of this technique is that it uses http which relies on the Transport Control Protocol (TCP). Such a protocol establishes a connection between the server equipment and the client equipment and enables the safe transmission of data by an acknowledgment exchange. Nevertheless, this signalling introduces a delay, due to retransmissions of lost data packets, which precludes the possibility of real time delivery.

4. SUMMARY OF THE INVENTION

An exemplary aspect of the present invention relates to a method for processing a request for the delivery of data sent by a customer terminal to a remote server equipment via a telecommunication network, said terminal being adapted to access said network by at least two links according to distinct access types, said data having been encoded in at least one stream with at least a predetermined bit rate, said stream having been previously cut into a plurality of segments.

The method according to the invention is particular in that it comprises the following steps, implemented for a segment of the at least one data stream:

Determining at least one sub-segment size at least based on the number of links and a size of the data stream to be delivered;

Calculating a partitioning of the segment into sub-segments according to said at least one set size and a distribution of the sub-segments on the plurality of links at least in accordance with a scheduling of the sub-segments in the partitioning calculated and a predetermined time constraint; and Sending a plurality of transmission requests of the sub-segments to the server on the plurality of links, at least according to the distribution calculated, a transmission request of a sub-segment on a link comprising at least one identifier of the segment, an index of a sub-segment start and an index of a sub-segment end.

With the invention, the delivery request of a segment of the data stream is converted into a plurality of sub-requests on each of the links available to access the communication network. The sub-requests relate to one or more sub-segments of smaller sizes than the entire segment.

Thus, the invention relies on a completely novel and inventive approach to the delivery of multimedia data, based, on the one hand, on a decision to cut a segment of data encoded into sub-segments of suitable size at least according to the number of links available in parallel and, on the other hand, to a distribution of the sub-requests on these links.

Requiring sub-segments of smaller sizes than the segment makes it possible to reduce delivery latency. The involvement of multiple accesses to the network for the same delivery makes it possible to optimise the exploitation of available resources and to reduce the overall delivery time.

An advantage of the invention is that it does not modify the operations of the network and of the server equipment. In fact, the invention relies on a known operation of a web server which enables it to respond to a request for delivery of a chunk of a multimedia data stream comprising positioning information for this chunk in the file.

According to an advantageous characteristic of the invention, the method further comprises a step of measuring parameters representative of a network state on the plurality of links, implemented upon receiving sub-segments from the server on said links in response to the transmission requests and a step of updating the steps of determining a sub-segment size per link and calculating a partitioning and a distribution of the sub-segments on the links according to the measured parameters.

Following the reception of the first sub-segments on the various links, parameters representative of a network state on these links are measured and exploited to adapt the size of a sub-segment per link and to refine the distribution of the requests between the different links.

The measured network parameters are typical of the efficiency of a link and include, for example, latency, maximum throughput, loss rate and network jitter.

Advantageously, it is possible to assign weights to the links according to the calculated network parameters in order to take these weights into account during the step of distributing the sub-segments on the links.

According to another aspect of the invention, the method comprises a step of determining a frequency for transmitting the requests on a link according to the measured network parameters and in that the transmission requests of the sub-segments on said link are transmitted at the determined transmission frequencies.

This allows the implementation of a burst mode, in which the client equipment does not wait for the server equipment to respond to a first request on a link to issue another one on the same link, in order not to be constrained by a sequential mode that would slow down the transmission of data from a link. The frequency or transmission rate is chosen in an appropriate manner so as not to saturate the network link.

According to another aspect of the invention, the method further comprises a step of obtaining an encoding structure comprising at least one piece of information representative of a type of data encoded in the segment associated with position information of the data of this type, a step of assigning a decoding priority level to the sub-segments of a segment according to the type information and to predetermined rules, and in that the step of partitioning the segment into sub-segments and the step of distributing the sub-segments on the plurality of links also take into account the levels of decoding priorities assigned to the sub-segments.

An advantage of assigning levels of decoding priorities to the sub-segments is to allow the implementation of a strategy for distributing the sub-requests on the available links, which favours the higher-priority sub-segments and the requests on the most reliable links. For example, a high decoding priority level is assigned to sub-segments containing encoded data belonging to an Intra (or I) image, because such an image serves as a reference for decoding other images. It is therefore important to ensure its delivery reliably. It is understood that this requires obtaining the position information of the boundaries between the images in the sub-segment before requesting the corresponding sub-segment. This indexing must first be obtained by the client.

According to another aspect of the invention, the information representative of a data type is obtained by sending a request for description of the segment to the server equipment and by receiving a description file of an encoding structure of the segment comprising said information.

The MPEG DASH standard has an "On Demand" type profile to allow a client of a Video on Demand application to move in a segment of a data stream and perform fast-forward functions. The implementation of such functions requires indeed to know the structure of the encoded data in order to locate the positioning of the reference images I and to trigger the hop from one image I to another. The description information of the encoding structure of the segment is contained in a description file of SSIX type (for "sub-segment index").

The invention advantageously proposes to take advantage of this description information for real-time purposes the better to break a segment down into sub-segments and to distribute them on the various access links to the network.

According to another aspect of the invention, the step of measuring network parameters comprises measuring a latency time between the transmission of a request for transmission of at least one sub-segment on a link and the reception of the requested sub-segment and in that said method comprises, in the case of a latency time measured greater than a predetermined threshold for said request, a decision step for triggering an action at least as a function of a priority level of decoding assigned to the requested sub-segment, said action belonging to a group comprising at least:

Retransmission of a new transmission request from the same sub-segment to another link;
Cancellation of the current request.

One advantage is to quickly detect that a transmission problem has occurred and decide on a solution to set up for the sub-segments queried by another link, by minimising the extra time on the overall data delivery.

The consideration of the priority level of the data for the decoding of a sub-segment in the distribution of the sub-requests on the available links proposed by the invention makes it possible to limit the damage due to the possible non-reception of this sub-segment for the subsequent decoding of the multimedia data, in particular in terms of rendering quality.

If the priority level of the sub-segment is low, the action triggered will be the plain and simple cancellation of the request. Further processing of the data will be done without the missing sub-segment. One advantage to cancel a sub-request, rather than leaving its course is to avoid unnecessary signalling and occupation of the associated bandwidth. If, on the contrary, the priority level of the sub-segment is high, the triggered action is to issue a new request for the same sub-segment on another link. Both actions can of course be triggered simultaneously.

According to another aspect of the invention, the customer terminal and the server equipment are arranged to communicate according to a communication protocol with acknowledgment exchange and when the action decided is a cancellation of the current request, the method comprises a step of transmitting an acknowledgment message to the server. The aim is to make the server equipment believe that the sub-segment has indeed been received. This makes it possible to bypass an acknowledgment mechanism imposed by a communication protocol in connected mode, of TCP type and to avoid the heaviness.

According to another aspect of the invention, the received description file further comprises information representative of a data membership group and at least one first encoded data stream being available at a first bit rate and a second stream at a second bit rate, the method comprises a step of selecting a stream in which a sub-segment of the current segment can be requested, at least based on the measured network parameters, the decoding priority level of the subset of the membership group of data of the sub-segment and the predetermined time constraint.

An advantage is to benefit from each representation or quality of stream available at the server to optimise delivery within a segment. In addition to an optimisation of the use of resources based on a distribution of the sub-segments on the links available with a granularity finer than the segment, the invention also makes it possible to adapt in a finer bit rate than the prior art.

Indeed, for a given sub-segment, the data stream with the highest possible bit rate is chosen, making it possible on the one hand to satisfy the predetermined time constraint while taking into account the membership group of the data encoded in the sub-segment. For example, this membership group is a GoP comprising an image of type Intra and other images of type P or B which depend on the image I. It is understood that the images of the same GoP and therefore the sub-segments must be requested in the same stream. The invention therefore makes it possible an Intra by Intra adaptation.

The method which has just been described in its various embodiments is advantageously implemented by a device for processing a request for the delivery of multimedia data.

Disclosed is therefore a device for processing a request for the delivery of data sent by a customer terminal to a remote server equipment via a telecommunication network, said terminal being adapted to access said network by at least two links according to distinct access types, said data having been encoded in at least one stream with at least a predetermined bit rate, said stream having been previously cut into a plurality of segments.

According to the invention, said device comprises the following units, implemented for a segment of said at least one data stream:

Determination of at least one sub-segment size at least based on the number of links and a size of the data stream to be delivered;

Calculation of a partitioning of the segment into sub-segments according to said at least one set size and a distribution of the sub-segments over the plurality of links at least in accordance with a scheduling of the sub-segments in the partitioning calculated and a predetermined time constraint; and Sending a plurality of transmission requests of the sub-segments to the server over the plurality of links, at least according to the distribution calculated, a transmission request of a sub-segment over a link comprising at least one identifier of the segment, an index of a sub-segment start and an index of a sub-segment end.

Such a device can advantageously be integrated into a customer terminal.

The invention thus also relates to a customer terminal adapted to access a communication network by at least two links according to distinct types of access, comprising a device for processing a request for the delivery of data according to the invention.

Alternatively, such a device can also be integrated into a proxy module adapted to be placed upstream of a client equipment. The invention therefore also relates to a proxy module arranged as cut-off system of a customer terminal and of at least two links according to distinct types of access for accessing a communication network, characterised in that it comprises a device for processing a request for delivery of data according to the invention.

The invention also relates to a computer program comprising instructions for implementing the steps of a method for processing a request for delivery of a multimedia data stream as described above, when this program is executed by a processor.

This program can use any programming language. They can be downloaded from a communication network and/or recorded on a computer-readable medium.

Finally, the invention relates to a recording medium, readable by a processor, integrated or not integrated with the device for sending a request for delivery of a multimedia data stream according to the invention, possibly removable, respectively storing one computer program implementing a method for processing a request for delivery of data, as described above.

5. LIST OF FIGURES

Other advantages and characteristics of the invention will appear more clearly on reading the following description of a particular embodiment of the invention, given by way of a simple illustrative and non-limiting example and of the appended drawings, among which:

FIG. 1, already described, schematically shows the exchanges implemented by a client equipment with a server equipment for the delivery of a multimedia data stream in adaptive streaming, according to the prior art;

FIG. 2 schematically shows a client equipment having several access links to a telecommunication network for requiring the delivery of a multimedia data stream to a server equipment, according to the invention;

FIG. 3 schematically shows the steps of a method for processing a request for delivery of a multimedia stream by a client equipment according to an embodiment of the invention;

FIG. 4A schematically shows an exemplary structure of a sequence of encoded images implemented in one embodiment of the invention;

Figure 6:
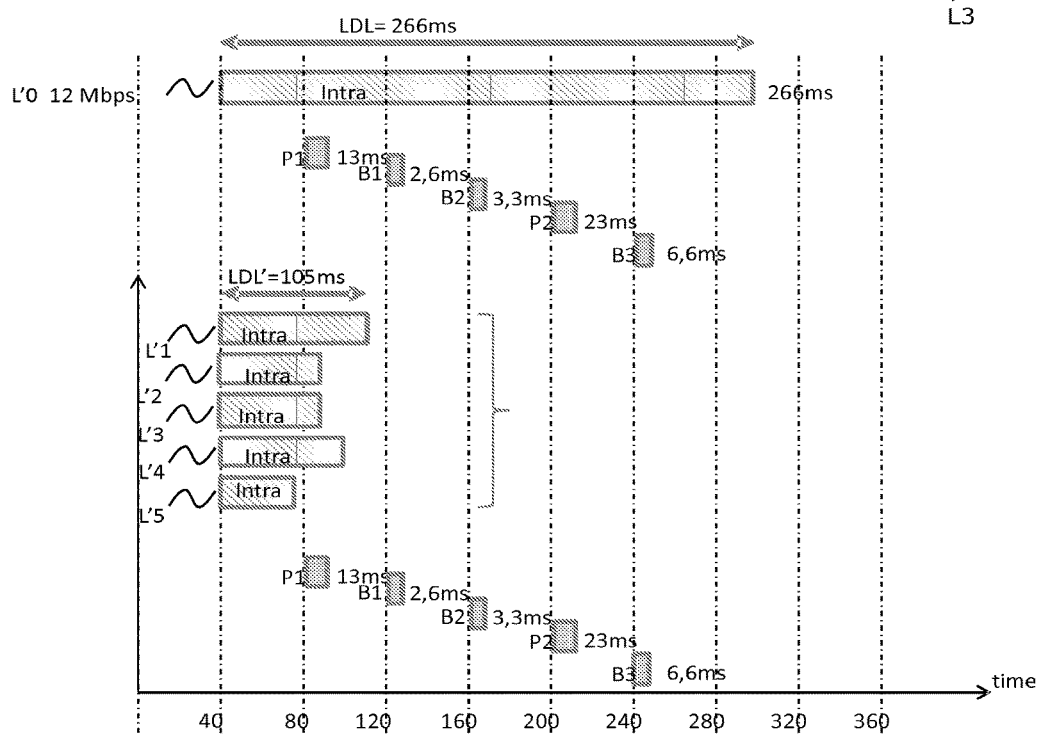
Figure 7:
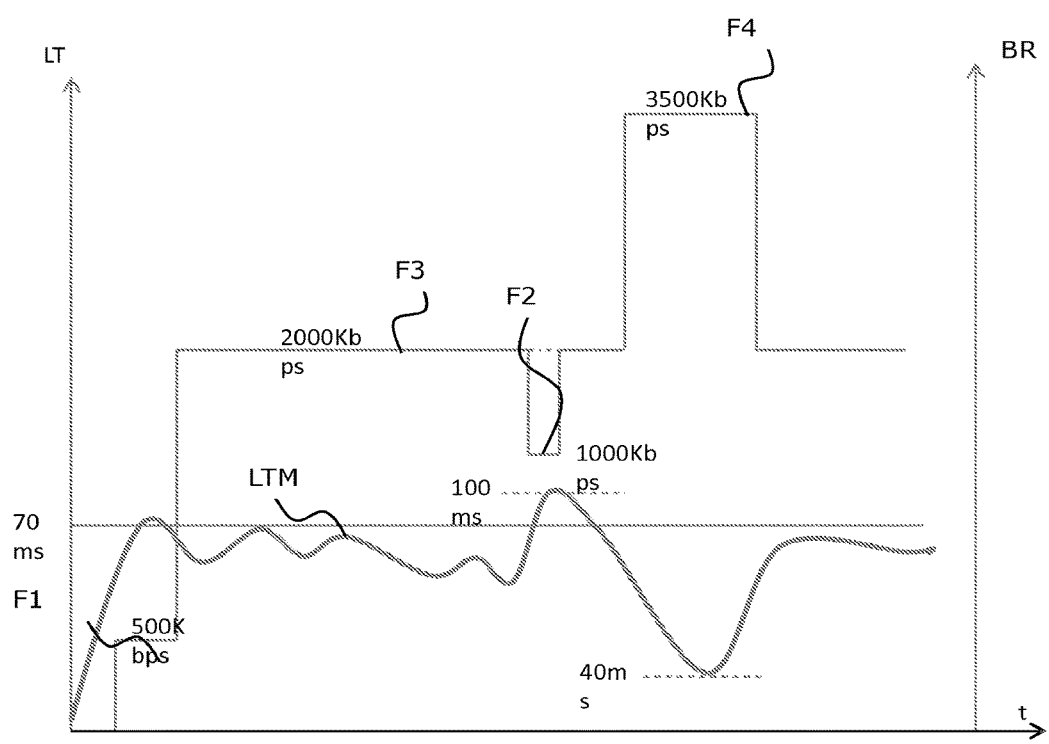
Figure 8:
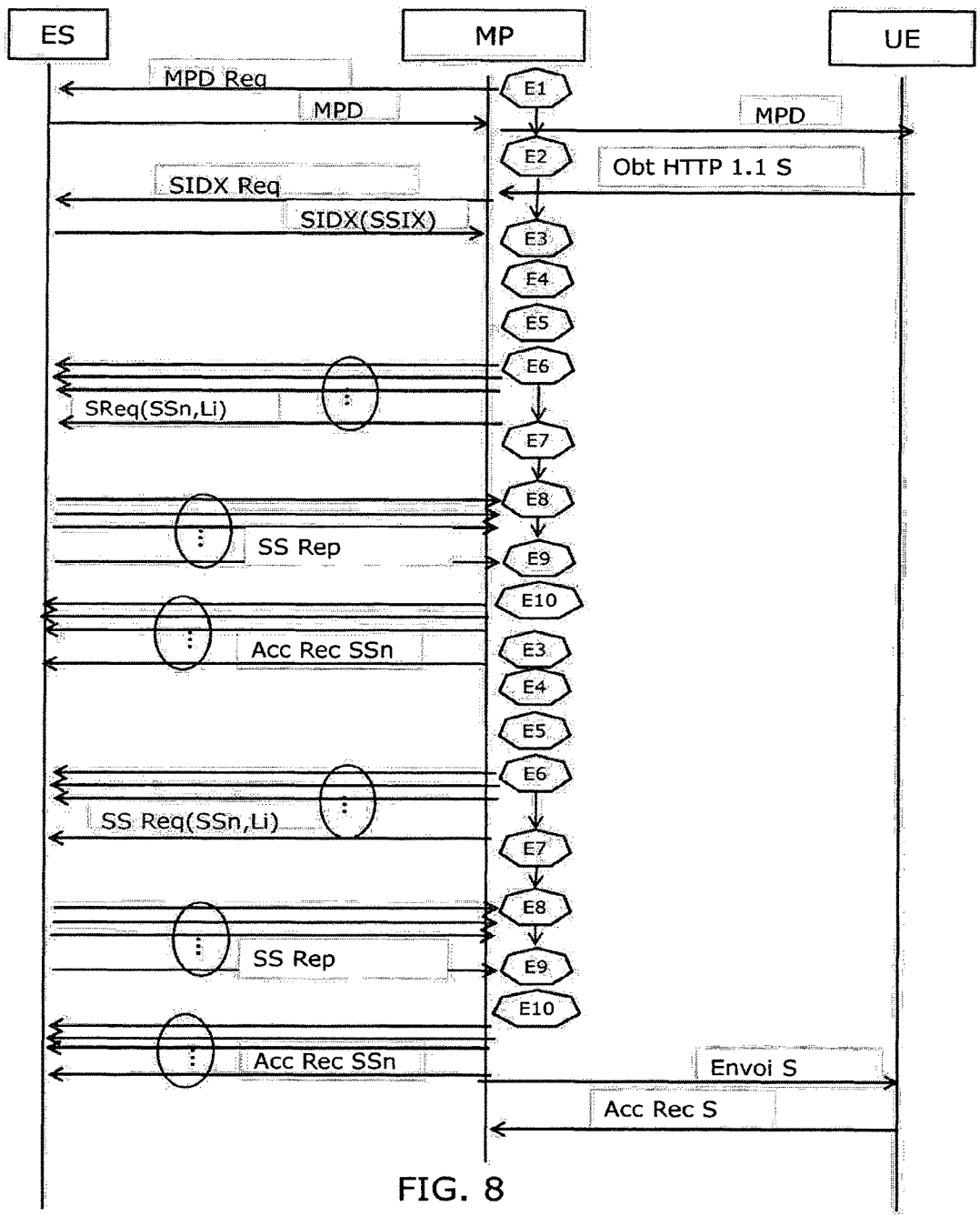
Figure 9:
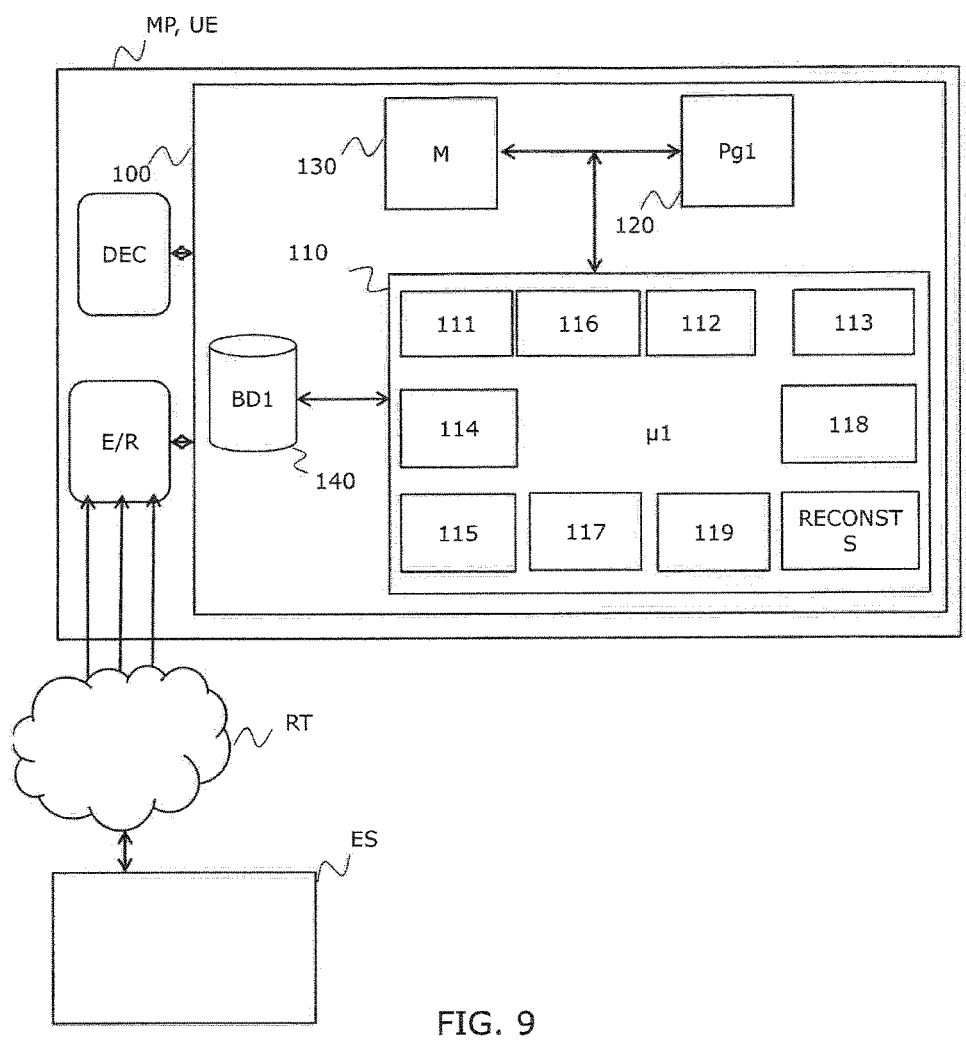

FIG. 6 schematically shows a diagram of the streams exchanged between a client equipment, a proxy module and a server equipment for the delivery of a multimedia data stream according to an embodiment of the invention;

FIG. 7 illustrates using a mean latency curve, based on time, the step of choosing a representation for the segment being delivered according to an embodiment of the invention;

FIG. 8 presents schematically an example of bit rate adaptation to respond to a predetermined delay constraint according to an embodiment of the invention; and FIG. 9 schematically shows an example of a simplified structure of a device for processing a request for delivery of a multimedia data stream according to the invention.

6. DESCRIPTION OF A PARTICULAR EMBODIMENT OF THE INVENTION

The general principle of the invention is based on the division of data segments available from a server equipment into sub-segments of sizes determined by a client equipment at least based on the number of access links to the telecommunication network available, on the performance of each of these links for example in terms of latency and bandwidth and the size of the data stream to be delivered.

Figure 1:
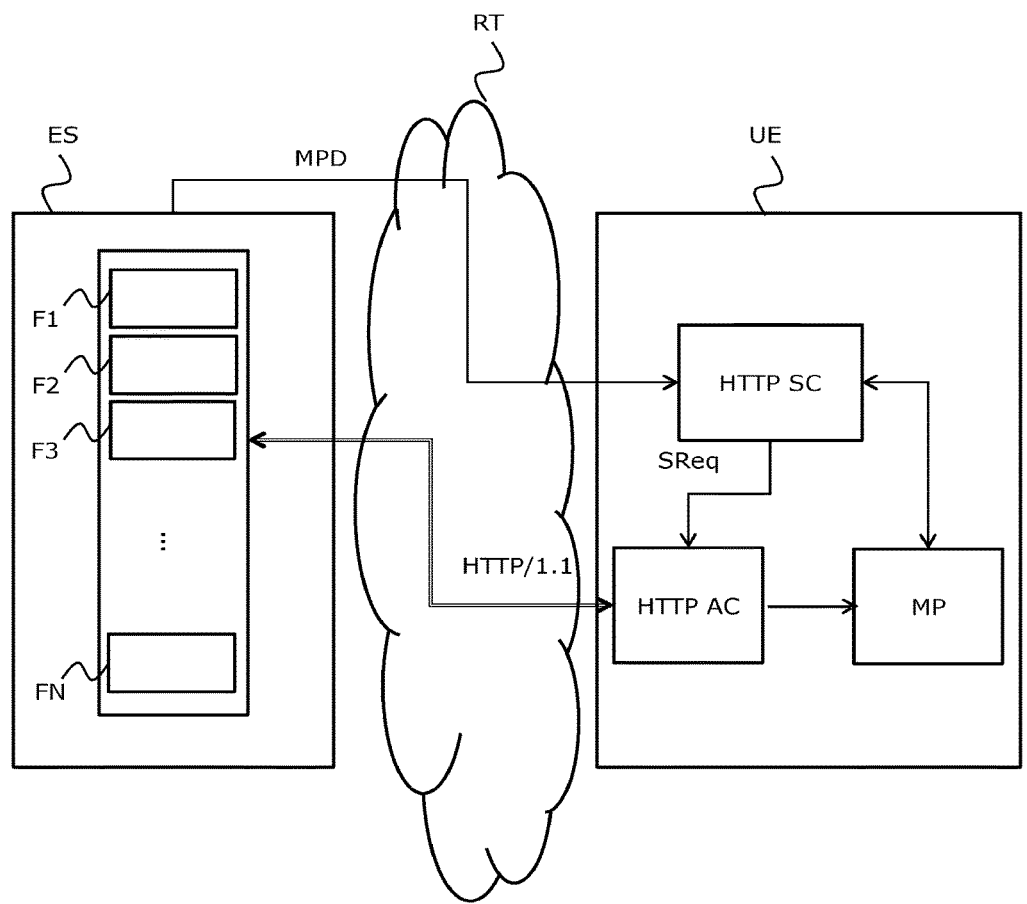
Figure 2:
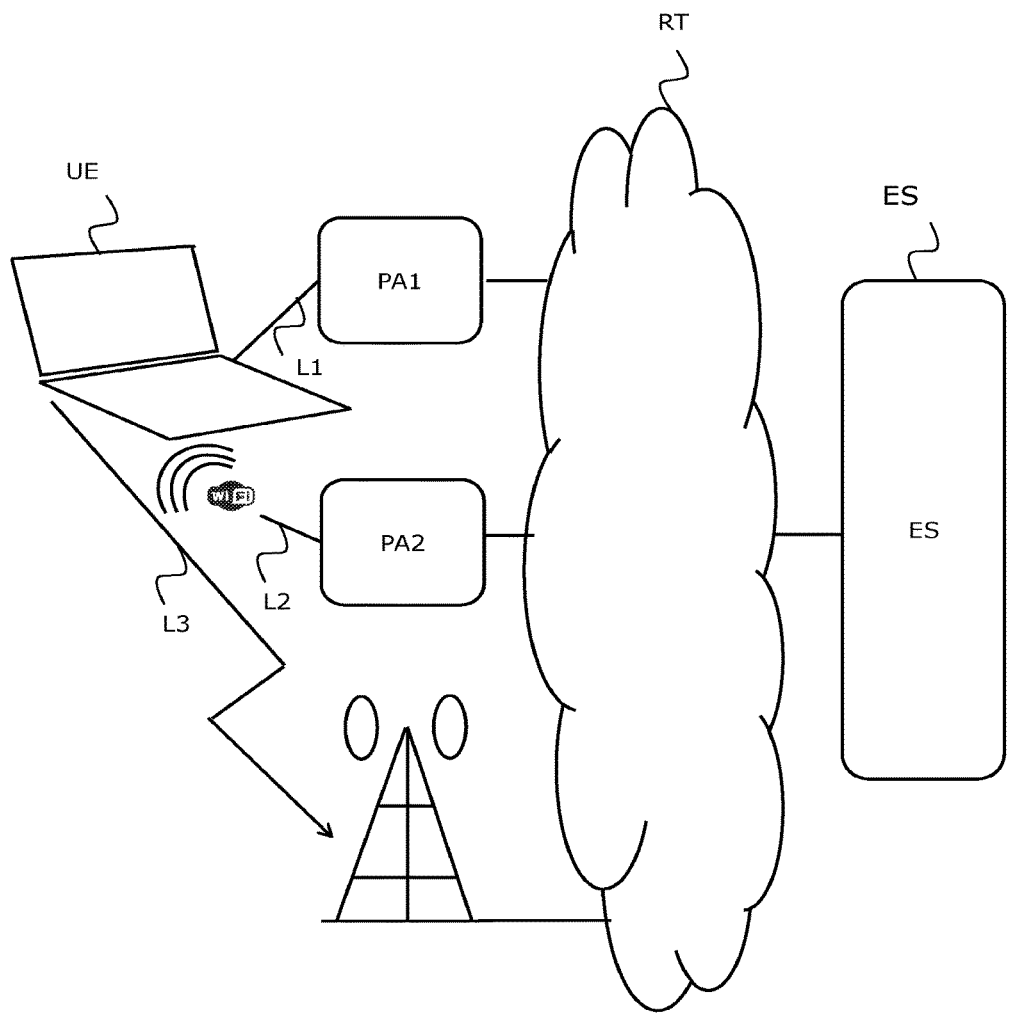

Such a cut-out reduces the transmission latency on each link and optimises the use of the available bandwidth on the different links. In relation to FIG. 2, let us consider an exemplary background implementation of the invention. In particular, let us consider an customer equipment UE, such as a laptop, tablet or smart phone connected to a telecommunication network RT, by a plurality of access links. In this example, the customer equipment UE has:

- a wired link L1 to a home and company gateway-type access point PA1;
- a radio access link L2 to an access point PA2, of Wifi type according to IEEE standard 802.11x; and
- a radio access link L3 to an access point PA3, for example a base station ("node-B" for 3G, "e-Node B" for 4G) of 3G, 4G-type or future generation of the 3GPP standard.

For simplicity, a single telecommunication network RT has been shown. Of course, this network can be composed of several access networks, according to the access technologies which have just been cited by way of example, WAN (for "Wide Access Network") or mobile to the IP network (for "Internet Protocol").

By means of these various links, the customer equipment UE can connect to a server device ES, for example in a client-server mode, a web-based technology and an http-type communication protocol to request the delivery of a multimedia data stream made available by the server equipment.

In the remainder of the description, the link is designated both by a particular access Li to the telecommunication network RT available to the customer terminal and the whole of the path followed by the data exchanged by the customer terminal with the server equipment via this particular access.

In the following we consider that the customer equipment UE and the server equipment ES are arranged to implement the adaptive streaming technology according to the MPEG-DASH standard.

Figure 3:
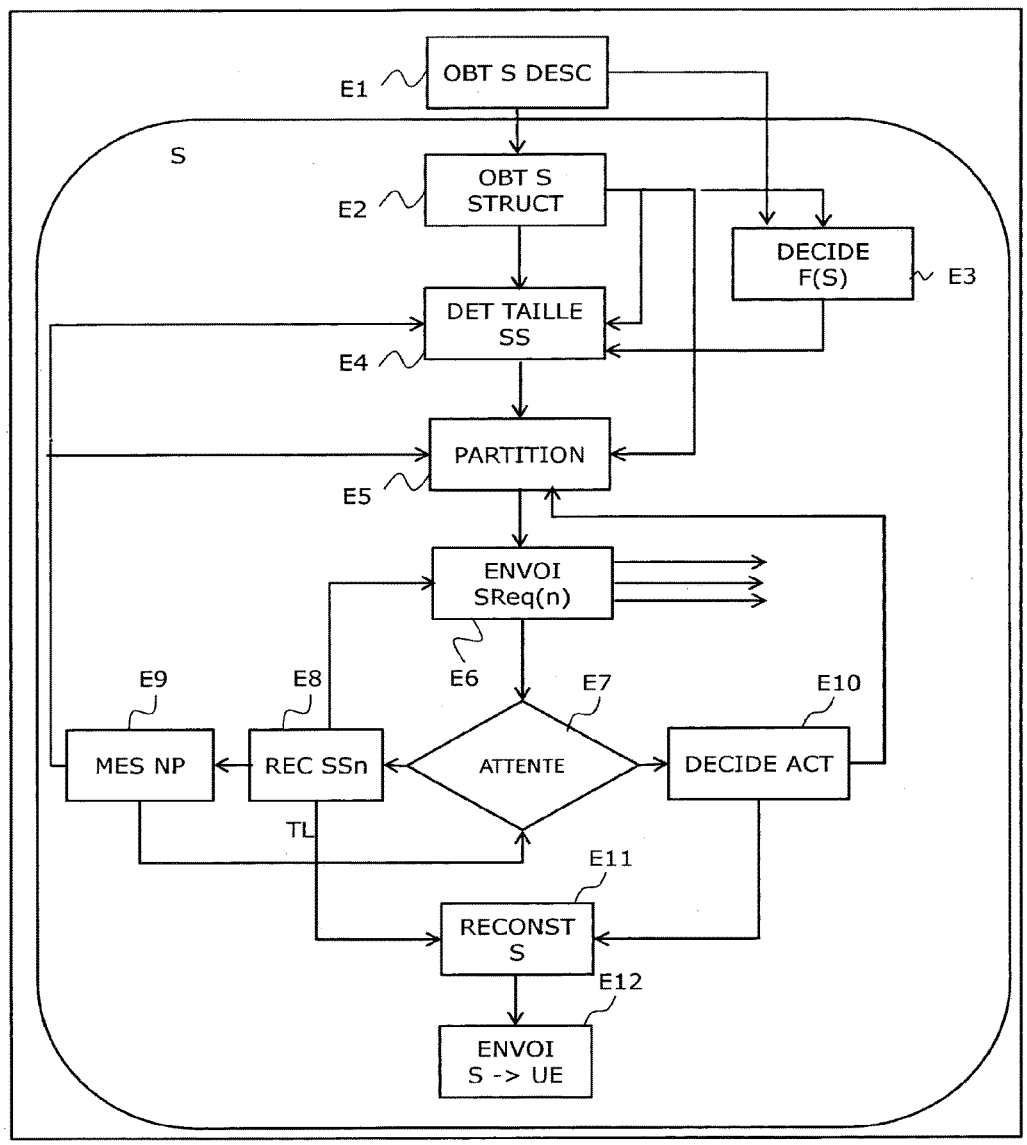

Referring now to FIG. 3, the steps of a method for processing a request for delivery of multimedia data according to an embodiment of the invention are described. The request for delivery of data has been sent by a customer equipment UE destined for a server equipment ES. It is considered that the method which will be described can be implemented by a device integrated in the client equipment itself or by a proxy module placed in a cut-off between the links L1, L2, L3 for access to the network and the customer equipment. The device according to the invention is therefore arranged to intercept the request and to process it.

During a step E1, a request to describe the data to be delivered, transmitted by the client equipment and received by the device according to the invention, is transferred to the server equipment ES. For example, this request is of the "MPD request" type. In response, a description file of type MPD is obtained. In a known manner, such a file describes the different segments of the multimedia data stream which are available at the server equipment ES in each of the possible representations of the same stream, each corresponding to a given bit rate, and therefore to a given quality. In particular, for a segment S of a given representation, the description file comprises at least the size of the segment and information on the location of this segment, for example of the url type, in order to access the entire segment.

With the invention, it is also necessary to access information representative of the sub-segment positioning in the byte range, for example a byte index of the start of a sub-segment and an index of the end of a sub-segment.

In the case of an "on-demand profile", the MPEG-DASH standard uses an ISO File Base File File Format (ISOB-MFF), including an @SIDX address, requiring a detailed description, called SSIX (for "Sub Segment Index") of an encoded structure of the segment S for a representation F(S). This detailed description associates with positioning information, for example a start index (in bytes) and an end index, a piece of information representing a type of encoded information.

This profile has been designed to allow a client of a "video on demand" application to move in a segment of a data stream and perform read-only "Fast forward"-type functions. The implementation of such functions requires indeed to know the structure of the encoded data in order to locate the positioning of the reference images I and to trigger the hop from one image I to another.

During a step E2, the device according to the invention thus requires the detailed description of the SSIX associated with the quality of representation F(S) of the segment S at the address @ SIDX obtained.

For example, in the case where the data stream represents an encoded video sequence, such a description provides information on the type of image encoded in the segment S and on a membership group of the encoded data. According to a type of MPEG encoding scheme, for example, the images of a sequence are grouped into GOP (for "Group of Pictures").

According to one embodiment of the invention, a single description may be required corresponding to a particular representation F(S). According to another embodiment, several descriptions are required corresponding to several representations.

Figure 4A:
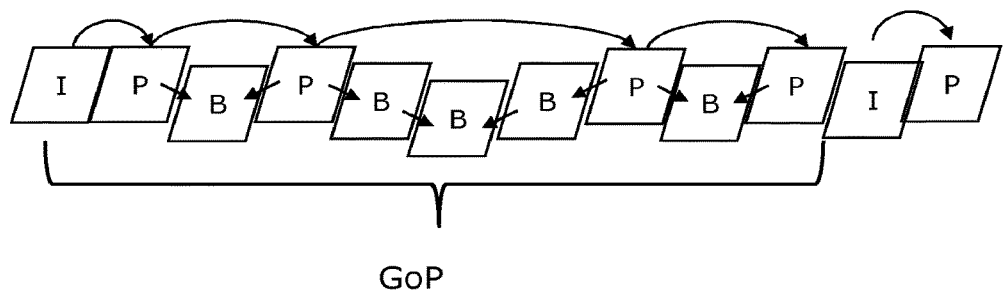
FIG. 4B shows an example of quantities of encoded information to be delivered per type of structure of images according to an encoding scheme of MPEG type.

In relation to FIG. 4A, a typical example of a GOP structure comprising images of different types is presented: a reference image, called image I, encoded independently of the other images, predicted images of type P, encoded by prediction with respect to the reference image I and bidirectional type B images, predictively encoded with respect to two past or future I, P or B images.

It is therefore understood that the description SSIX associates an image type and a membership group with data positioning information or byte range in the segment S for a given representation quality F(S).

Figure 4B:
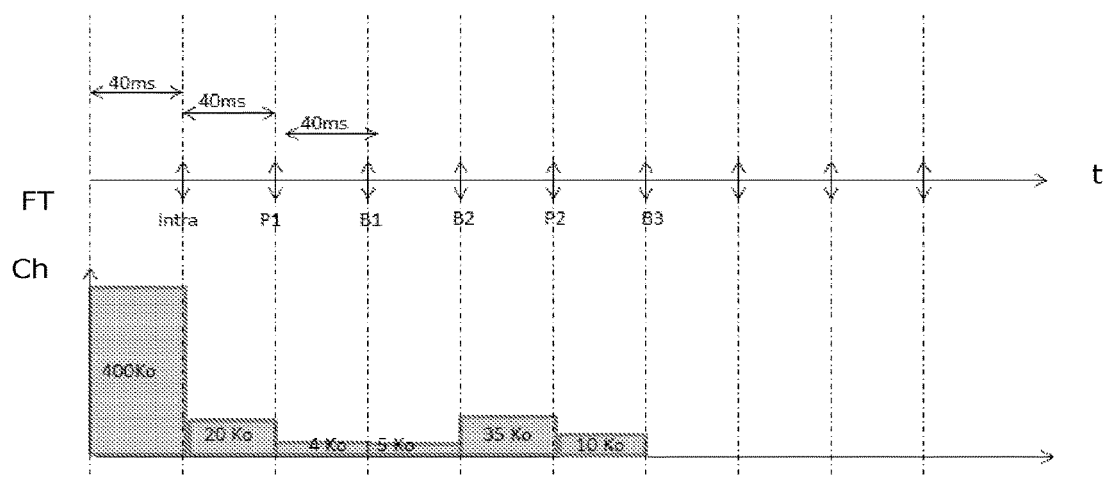

Referring to FIG. 4B, an example of frame load FL is presented in terms of quantities of data encoded by image type FT of a GoP. This clearly illustrates the fact that a reference image I represents a much greater frame load than a P or B image and highlights the need to take full advantage of the available network resources in order to optimise the transmission of the data of the image I on which all the other images of the GoP depend.

During a step E4, a size Ti of sub-segment per link Li of access to the network RT available at the customer equipment UE is determined, with i an integer between 1 and the number of links, at least depending on the volume of data of the segment to be delivered in the chosen representation and the number of access links available.

A first simple embodiment of this step is to divide the size of the segment to be delivered by the number of access links.

Advantageously, this step E4 also takes into account parameters representing a state of the communication channel on each of the available access links. These parameters have, for example, been previously measured during a previous delivery of another data stream or of a previous segment of the same data stream. They include for example a measurement of latency time, a measurement of the transmission rate, a measurement of a data loss rate or a jitter measurement, that is to say a measurement of transmission delay between two packs of required simultaneously.

These parameters provide information about a link capacity considered to transmit a sub-segment in terms of download speed, hence delay, reliability, loss rate, etc. It is understood that these parameters affect the size of a sub-segment. For example, for a link associated with a high latency, we shall determine a smaller sub-segment.

A sub-segment size for a link type takes into account the efficiency of the link, in terms of latency and bit rate. Latency is typically deducted from the RTT (for "Round Trip Time"); the effectiveness of a link Li is for instance shown as an effective weight Epi, which can be expressed as follows:

$$Epi = 66 \cdot \frac{bpi}{\sum_{(1,n)} bpi} + 33 \cdot \frac{\min[RTT(L_{1,N})]}{\min[RTT(Li)]} \qquad \text{Eq 1}$$

in which bpi means the measured bandwidth on the path corresponding to the link Li and RTT(Li) the Round Trip Time of the link Li.

This example gives a weight three times higher to the bit rate than to the latency. The size of the sub-segment will then be calculated according to a distribution algorithm, for example:

$Ti = TS \times [Ep/\Sigma Epi]$, with TS the size of the segment.

Advantageously, this step E4 exploits the knowledge of the structure of the segment data obtained by E2. For example, it emphasizes the fact to cut the segment into sub-segments comprising data of one and the same type, for easier processing of the sub-segments including their decoding phase. The aim is therefore to find a compromise between a sub-segment size that satisfies transmission constraints on a link and a size that minimizes the number of "hybrid" segments that is to say, bringing together data of at least two different types.

At the end of step E4, a size Ti of a sub-segment was determined, adapted to each link Li to the network RT.

During a step E5, we use sub-segments of determined sizes to cut the segment to be delivered into sub-segments and allocate the cut sub-segments on the different access links to the telecommunication network RT. This step takes into account a scheduling of sub-segments in the segment to be delivered. Indeed, to be able to decode and play without waiting for the data stream as the sub-segments are received, we must receive them in the correct order. Therefore, the requests for sub-segments should be allocated on each link so as to receive the sub-segments in accordance with their original scheduling in the segment to be delivered.

At this stage, it is understood that the steps of determining sizes of sub-segments, of cutting a segment into sub-segments of the specified size(s) and of distributing the sub-segments obtained on the links Li are closely interwoven, particularly when determining a size per link and when taking into account the structure of the encoded data in these steps.

Figure 5A:
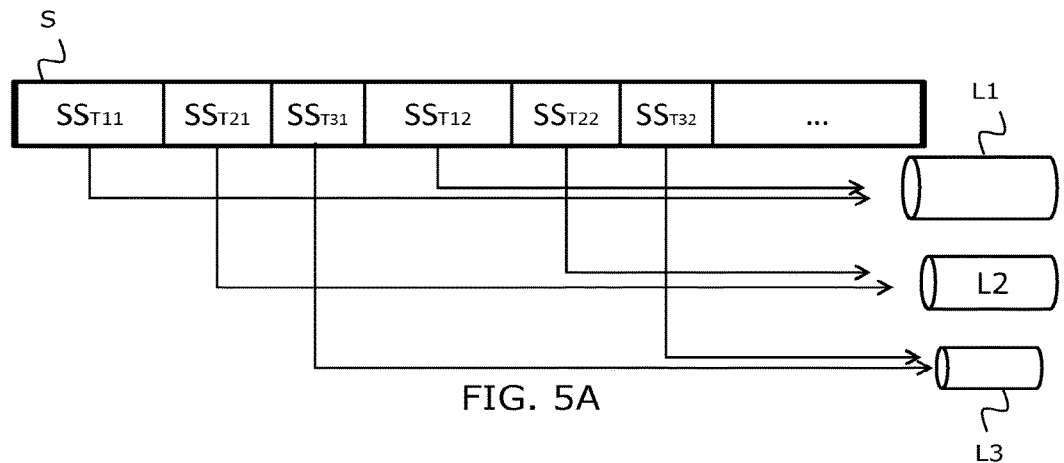
FIGS. 5A, 5B and 5C illustrate schematically three examples of distribution of the sub-segments cut in a segment on the various access links to the telecommunication network according to the invention.
Figure 5B:
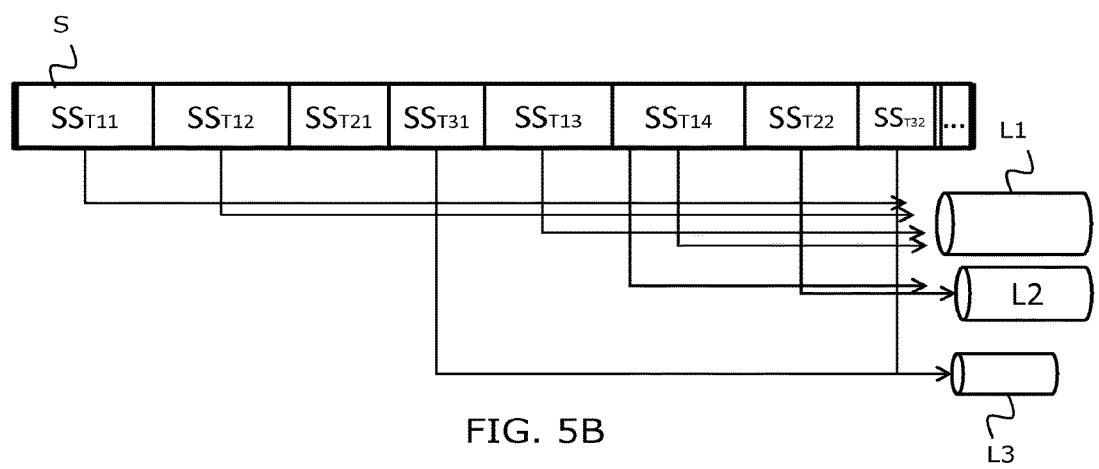

In connection with FIGS. 5A and 5B, we find two examples of cutting a segment S into sub-segments with size T1 determined for the link L1, T2 determined for the link L2, T3 determined for the link L3 and of distributing the sub-segments obtained on the three available links L1, L2, L3.

In the example in FIG. 5A, the segment S is cut successively into a sequence of distribution which comprises a sub-segment SST1 with size T1 which we will be queried on the link L1, a sub-segment SST2 with size T2 to be queried on the link L2 and a sub-segment SST3 with size T3 to be queried on the link L3.

In the example of FIG. 5B, the sizes T1, T2, T3 determined are identical, but the distribution sequence is selected differently: two successive sub-segments with size T1 are assigned to the link L1, followed by a sub-segment with size T2 attributed to the link L2 and a sub-segment with size T3 attributed to the link L3.

Advantageously, this step also takes into account on the one hand the knowledge of the parameters representing a state of the communication channel on each of the links. Indeed, they are indicative of a level of reliability of each link, of a bit rate, of a bandwidth etc. In other words, we shall ask more sub-segments in a link, for example L1 which has a higher bit rate than a link, L2 or L3 which has a lower bit rate.

Advantageously, this step E5 also takes into account the knowledge of the structure SSIX of the segment S, obtained in E2. Advantageously, a priority level was previously assigned to each type of data that may be included in a segment and this priority level is used to decide the distribution of the segments on the different links.

By way of example, we again consider the case of a sequence of images organised into GOP. It is understood that the type I reference images are very important for decoding the GOP because they are the basis for decoding other images, among which only the residual error with respect to this reference image was transmitted in the data stream. It is therefore appropriate to assign a higher level of priority than the images I than at the images P or B, with an image which might be in terms of type of encoded image.

Advantageously, the step E5 also takes into account the knowledge of the structure of the encoded data for cutting a segment into sub-segments and distribute the requests of sub-segments on the different links, for example by associating a level of decoding priority to a sub-segment based on the type of data it contains.

Figure 5C:
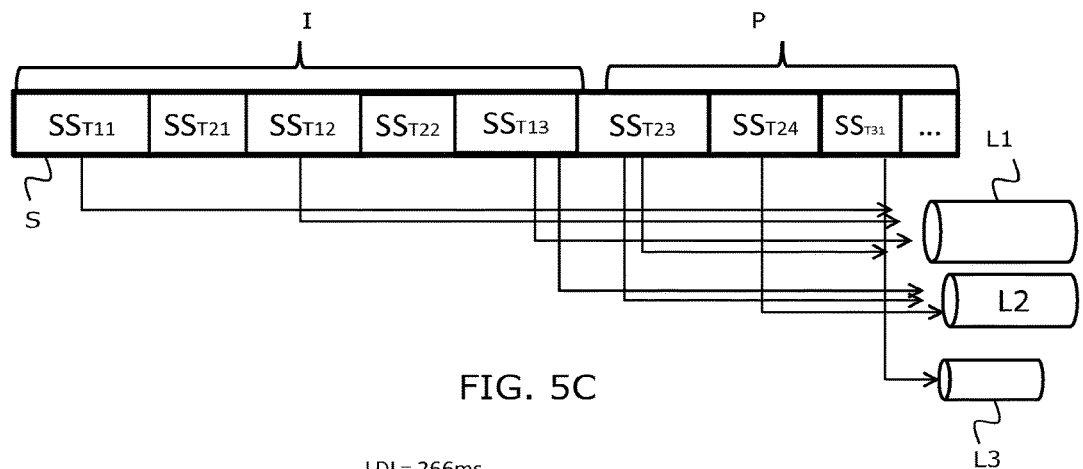

In connection with FIG. 5C, the segment S first comprises type I data and type P data. Suppose we assign a priority level 1 to type I data and a priority level 2 to type P images. The step E4 of distributing sub-segments on the links L1, L2, L3 available advantageously exploits this priority level and favours the links L1 and L2 which are more reliable to request the type I sub-segments. Conversely, it affects the type P sub-segments to the link L3 considered as less reliable. During a step E6, sub-requests Sreq (SSn) for delivering sub-segments SSn of the segment S are intended for the server equipment ES on the different access links to the network RT, according to the distribution which has just been determined.

By way of example, we consider a 1 s-time segment composed of an image Intra (I) of several hundreds of kilobytes (KB) of data followed by several Predicted images (P) of several tens of KB s and of several bi-directional images or B of a few KB s. A maximum level of priority is associated with the sub-segments SST11, SST22, SST12, SST22 and SST13 that include the encoded data of the image I. They are distributed on the most efficient links L1, L2 in terms of latency and bandwidth.

It is understood that this first distribution of sub-segments of the image I is important because it determines the overall latency of the delivery of the segment. In fact, the images P which are based on the decoded image I are expected by the decoder of the client equipment after the arrival of the image Intra, we therefore have a little more time to transmit, for example using a 3G mobile radio link; such as link L3, which is less efficient in terms of bit rate and latency, but which, due to its constant bit rate, ensures the reliability of the transmitted data.

As for images B, they are distributed on the different links following the sub-segments of the image I. Note that these images are less important for decoding, since they do not serve as reference to any other image of GoP. They are then associated with a lower priority level. One option may be to decode them when transmitted to the client equipment with the correct latency and to ignore them otherwise.

In a step E6, the sub-segments are requested on the links. We first consider that the sub-requests Sreq concern the first segment of the data stream. If the determined distribution corresponds to the example in FIG. 5A, a delivery sub-request of the first sub-segment SST1 is transmitted on the link L1, a delivery sub-request of the second sub-segment SST2 is transmitted on the link L2, a delivery sub-request of the second sub-segment SST3 is transmitted on the link L3.

Advantageously, these sub-requests are issued simultaneously on the three links in order to optimise the use of available transmission resources.

If the determined distribution corresponds to the example of FIG. 5B, the same delivery sub-request transmitted on the link L1 may advantageously involve several sub-segments, such as for example the first and second sub-segment SST11, SST12.

Upon making sub-requests, the process switches in E7 to await responses from the server equipment ES.

In E8, it receives the first responses Resp(SSn) from the server equipment. The process is then repeated for the next sequence of sub-segments.

In E6, the transmission of sub-requests for delivery of sub-segments of the segment S can be managed in different ways. According to a first aspect, a first burst of sub-requests is transmitted simultaneously on the links, one sub-request per link. The system then waits for the reception of the required sub-segments before triggering the transmission of new sub-requests. This type of management corresponds to a conventional mode.

Advantageously, a transmission mode of "burst" type (also called pipelining http) can be implemented, which consists in further transmitting on the same link a series of requests of sub-segments, a subsequent request is issued before having received the response of the previous request. In a real-time reception context, this type of management, as it seeks maximum transmission and processing resources from the server, enables to optimise the transmission time.

For example, one might consider issuing in a burst mode all the sub-requests of sub-segments assigned to a link in the distribution stage, this mode can nevertheless being switched on solely when real-time operation is becoming a problem for example in the case of a "heavy" image Intra which is a large data file and that despite the small buffer of the decoder (eg 40 ms buffer) may cause the arrival of other images and the loss of the live clock, and in this case faster downloading the following images with this burst mode makes perfect sense.

Conversely when everything unfolds almost synchronously, a sequential mode may prove sufficient.

Whatever the transmission mode of sub-requests used, the process starts, following the issuance of one or more sub-requests on a link, a step E9 of measuring a latency time between TL the issuance of a sub-request and the reception of a response to the sub-request on the link. More generally, this step E9 measure other parameters representative of the network status on the links L1, L2, L3 and updates the parameters previously used to determine a particular sub-segment size for each link. We understand that these new measurements are particularly instructive since they concern the transmission of sub-segments whose size was determined to be the most adapted as possible to the transmission conditions on a link. They are used to verify that it is optimal and that the delay constraint CD is respected.

Advantageously, the method includes a step E3 of choosing a representation for the segment being delivered. This step uses the network parameters measurements carried out in E9, especially the measurement of the latency time TL. Initially, the customer terminal has requested the segment S in a particular representation. Then, if the delay constraint CD is violated, or conversely if the network conditions are favourable, the step E3 enables to decide to change representation before the end of the delivery of the current segment. If the constraint is exceeded, it will choose a lower bit rate of representation, thus less costly in terms of bandwidth. On the contrary, if the measured latency is less than the constraint, it chooses to move to a higher bit rate representation to optimise the quality of the delivered data. The invention allows to adapt to changing network conditions with a finer granularity than the segment.

Of course, we understand that it is not always well-advised to change representation anywhere in the same GoP. In particular, the aim is to take into account the information regarding membership to a group as well as type of data obtained during the step E2. Indeed, the sub-segments corresponding to an image P or B which depend on a reference image I should be extracted from the same representation as the sub-segments corresponding to this image I, so that the decoding is possible at the customer equipment. We understand that it will be possible to change the representation from the image I below. The invention thus enables to track the delay constraint with an intra to intra granularity.

Advantageously, the process then repeats the step E4 of determining a size of a sub-segment per link from the new network parameter measurements and the step E5 of cutting the segment and of distributing sub-segments on the links, according to new and updated measurements of network parameters and sub-segment sizes.

In this way, we change the structure of real time sub-requests to adapt to the actual conditions of transmission on different links.

Of course, depending on the size of a segment, it is possible to apply the updates calculated at the next segment, which seems a good compromise between complexity and adaptability. In this way, the structure and distribution of sub-requests for a current segment are based on measurements made during the delivery of the previous segment.

To minimize the overall delay of transmission of data segments, the method according to the invention suggests to control the maximum quality of the segments delivered for a predetermined latency setpoint. For example, a live delay is set to 70 ms and the method calculates the corresponding downloading times for each of the available encoding levels (adaptive bit rate) and chooses the optimal representation.

When the latency time TL measured for a sub-request exceeds a predetermined threshold, for instance 70 ms (which includes the RTT, that is to say the delay between the transmission of a rising http request and the reception in return from the first bit data which is added the download time. For example, on a network with a RTT of 30 ms, there remain 40 ms to download the data), while no response to a sub-request has been received, a step E10 is implemented during which it is decided to undertake an action to remedy this problem. Several actions can be taken.

This decision step can advantageously take into account the knowledge of the structure of the segment obtained in Step E2, and in particular the priority level that was associated with the sub-segment(s) not received. This priority level provides valuable information to decide whether the receipt of this sub-segment is important for the decoding of the data stream or if the contrary, we can do without it, with the risk of an image quality which may be locally and temporarily degraded.

If the reception of this sub-segment is considered significant, for example because it is associated with a high priority level, it may be decided to renew the broadcast of the sub-request on another, more reliable link. It is understood that, due to the real time constraint associated with the delivery of the data stream segment, it is not possible to wait for delivery of the failing link beyond a predetermined limit.

If the reception of this sub-segment is not considered necessary, a decision may be to do nothing and decode the segment without the missing sub-segment.

At this stage, we consider a particular embodiment of the invention in which the customer equipment is an MPEG-DASH customer and the mode of communication used between the customer equipment CE and the server equipment SE complies with HTTP (for "Hypertext Transfer Protocol") over TCP (for "Transmission Control Protocol"). According to the latter protocol, the customer equipment and the server equipment previously establish a communication session during which the customer equipment can issue a delivery request to the equipment server. Once it has received the reply to its request the customer equipment acknowledges receipt to the server equipment. Until it has received acknowledgment from the customer equipment, the server equipment regularly retransmits the response to the request of the customer equipment. It is understood that this protocol ensures communication of data between the two pieces of equipment, but in case of transmission problem, the retransmission mechanism generates traffic and latency on the link that is little compatible with real time problems.

In this context, the step E10 can advantageously decide to cancel one http sub-request that does not receive a response on a link within the set time. In the previous embodiment, the cancellation action is interesting for images, i.e. non-priority sub-segments. It includes the closure of the current session with the server equipment on the relevant link. The interest of this cancellation is to stop trafficking and signalling such as the protocol TCP generated between the customer equipment and the server equipment that occupy the resources of these two pieces of equipment.

Alternatively, rather than cancel the sub-request in progress, it may be decided to systematically issue an acknowledgment of the response, even if it has not been received. The effect generated on the server equipment side will be the same as before, namely the closure of the current session.

We understand that it may be decided to carry out several actions simultaneously, for instance, cancel an existing sub-request on a link, to end the traffic generated by its processing and to renew the issuance of this sub-request on another link, considered more reliable to limit the delay in receiving the full segment.

In E11, the segment is reconstructed from the received sub-segments then transmitted in E12 to the customer equipment UE in response to its initial request.

The steps of the method are then repeated for the next segment of the stream data.

In connection with FIG. 6, we consider, by way of example the case of a first customer equipment having a wired access L0 to the network RT with a bit rate of 12 Mb/s. The first image I requires 266 ms in order to be delivered. Real time latency delay LDL is 266 ms. The other images are small and transmitted in less than 30 ms. It is not effective to sub-segment them further.

Then we consider the case of a second customer equipment having 4 wired accesses L'1 to the L'4 of ADSL type (for "Asymmetric Digital Subscriber Line") and a mobile access 4G L'5, and implementing the method according to the invention. The image I corresponds to a volume of data of 400 KB. It is divided into five sub-segments of different sizes to be requested for each of the 5 links, depending on the effectiveness Epi of each link, which may, as an example, be calculated from one of the following equations:

in the case where the access links are very close in terms of latency but have bit rate deviations:

$$Epi = 66 \cdot \frac{bpi}{\sum\limits_{(1,n)} bpi} + 33 \cdot \frac{\min[RTTp(1, n)]}{\min[RTT(pi)]} \quad \text{(Eq 1)}$$

in the case where the access links are very heterogeneous in terms of latency:

$$Epi = 66 \cdot \frac{bpi}{\sum\limits_{(1,n)} bpi} + 33 \cdot \frac{(1 - RRT(pi)/\sum(1,n)RTT(pi)}{(p-1)} \quad \text{(Eq 2)}$$

The size of a sub-segment adapted to the link L'i is calculated as follows, depending on the effectiveness Epi of the link L'i:

$$T'i = TF \cdot \frac{Epi}{\sum\limits_{(1,n)} Epi} \quad \text{(Eq. 3)}$$

with $T_F$ the size of the current image to be downloaded the segment S.

In this way, uploading an image $T_F$ is apportioned on the different links L'i available according to their respective efficiencies.

Thus the data sub-segment corresponding to a complete Intra image will be downloaded in parallel on the links of different efficiency in terms of bit rate and of latency:
- for the link L'1 having a bit rate equal to 14 Mbps, an RTT equal to 21 ms and an efficiency Ep=66×14/72+33× [(145−21)/145]/4=20, a size of sub-segment is determined as equal to 80 KB;
- for the link L'2 having a bit rate equal to 11 Mbps, an RTT equal to 27 ms and an efficiency Ep=66×11/72+33× [(145−27)/145]/4=17, a size of sub-segment is determined as equal to 68 KB;
- for the link L'3 having a bit rate equal to 5 Mbps, an RTT equal to 31 ms and an efficiency Ep=66×5/72+33× [(145−31)/145]/4=11, the size of sub-segment is determined as equal to 44 KB;
- for the link L'4 having a bit rate equal to 7 Mbps, an RTT equal to 36 ms and an efficiency Ep=66×7/72+33× [(145−36)/145]/4=13, a size of sub-segment is determined as equal to 52 KB;
- for the link L'5 having a bit rate equal to 35 Mbps, an RTT equal to 30 ms and an efficiency equal to Ep=66×35/72 33×[(145−30)/145]/4=39, a size of sub-segment is determined as equal to 1562 KB.

We understand that with the invention each link has a contribution in terms of volume of data provided to the delivery of data for its performance in download time measured from the network parameters. The download times of the various sub-segments on the links will depend on the nature of the link (latency and bandwidth).

Experimentally for the 5 links given in the example, we obtain for the L'1 a download time of 68 ms, for the link L'2 a time of 74 ms, for L'3 a time of 105 ms, for L'4 a time of 89 ms and for L'S a time of 54 ms.

The largest sub-segment is delivered in 105 ms. As a result, the real-time latency time LDL is reduced to 105 ms.

In the example described in connection with FIG. 7, we consider another example in which the server equipment ES offers 4 performances or data streams for the same content:

a stream F1 encoded at 500 kbps;
a stream F2 encoded at 1000 kbps;
a stream F3 encoded at 2000 kbps; and
a stream F4 encoded at 3500 kbps.

There is shown in the same figure a plot LTM of the average latency of the various network links based on the time and representation as a staircase of the representation qualities selected by the device according to the invention over time.

To satisfy a predetermined delay constraint CD, in this example equal to 70 ms, the method according the invention selects, in a step E3, a representation at a bit rate BR among those available (F1 to F4), e.g. F1 at 500 Kbps; to request the first sub-segments. This choice takes into account not only the delay constraint CD, but also the networks conditions. In this example, we see that the playback of the encoded data is started at quality F1, the lowest available, which enables to initiate the playback by ensuring the delay setpoint. For the following GoP, we switch to the quality F3, which is higher and respects the setpoint. This regime lasts during the transmission of multiple GOPs until the appearance of network problem, and in response to an average, increasing latency, we come down to the quality F2. Then, given that the average latency measured drops, it switches to a representation F4 of higher quality.

In connection with FIG. 8, it now presents a diagram of the streams exchanged between a customer equipment UE, a proxy module MP and a server equipment ES according to an exemplary embodiment of the invention. In this example the module MP placed upstream of the customer equipment UE, implements the method of processing a delivery request of a data stream according to the invention which has just been described in connection with FIG. 3. This module has access to different links L1, L2, L3, available to the customer equipment. In this example, the customer equipment UE complies with the MPEG-DASH standard and its operation is not affected by the invention.

In a known manner, the customer equipment UE sends a request "MPD Request" for a description of a data stream FD to the server equipment ES on one of its links L1, L2 or L3 for accessing the network RT. In E1, the request is relayed transparently by the proxy module MP and transmitted to the server equipment ES.

The server equipment ES responds by transmitting the corresponding description file MPD.

In a known manner, the customer terminal UE requests the delivery of a segment S of the data stream to the server ES by issuing a type of http request Req (S) on the same link Li as previously.

This request is intercepted by the proxy module MP, which transmits in E2 a request "Sidx Request" describing the segment S at the server ES on one of the links available, for instance the link Li chosen by the customer UE.

In response, the server ES transmits the description file SIDX (SSIX) of the segment S.

In E3, the proxy module can choose a representation to request the segment S. At first, it usually chooses the one that has been requested by the customer terminal.

From the information contained in this file regarding the structure of multimedia data encoded in the segment S for each of the representations and the knowledge of representative parameters of a network status on the links available, the proxy module determines in E4 a sub-segment size adapted to every link Li.

Then, in E5, the proxy module MP cuts the segment S into sub-segments of defined sizes and distributes them on the different links.

In E6, it transmits the first sub-requests S-Req(SSn, Li) on the different links. In E7, it switches into waiting mode for receiving initial responses.

The ES server, upon receipt of sub-requests Sreq(SSn, Li) transmits responses including the sub-segments SSn requested on the links Li concerned. Then it waits for an acknowledgment from the customer UE.

In E8, the module MP receives the first responses S-Rep (SSn, Li), it stores them in memory, for example in a buffer.

Upon receipt of the first responses, it updates in E9 the measurements of the network parameters, particularly the latency time TL of the links concerned.

Advantageously, the steps E3, E4 and E5 are repeated to take into account the new measurements of network parameters and optimise the choice of representation, the sub-segment sizes and the distribution of sub-segments on each link.

Advantageously, the sub-segments corresponding to a priority image Intra are requested repeatedly on different links measured as very effective. According to this option, the proxy module takes into account on the proxy side only the sub-segments arrived first. One advantage is to avoid retransmissions that may not be achievable any longer in the predetermined time set.

If after a predetermined latency time, sub-segments have not been received, the proxy module decides in E10 about an action to trigger for remedying purposes, for example to request the sub-segment on another link, cancel the current request etc.

The request step E6 is iterated to request the following sub-segments. As described above, different strategies can be implemented. For example, the proxy module MP expects to have received previous sub-segments on the different links to request the following ones, which can take into account new measurements of network parameters and thus optimise the use of resources of the different links. An alternative is to require the sub-segments assigned to a given link in burst mode, without waiting for the first sub-segments. One advantage is to minimise latency on the link as far as possible. However, the optimisation of the distribution may be implemented only for the next segment.

Once it has received all the possible sub-segments from the segment S, the module MP reconstructs the sub-segment E11 and transmits it to the customer EU in E12 as a response http Rep(S) according to the standard MPEG-DASH.

According to the communication protocol used, the customer terminal UE may acknowledge receipt of the segment S required. In this case, the proxy module MP does not transmit the acknowledgment message to the server ES.

It is understood that according to this embodiment, the customer equipment UE can continue to function in a normative way, while benefiting from optimised delivery, which operates all the links available to access the telecommunication network.

Note that the invention which has just been described, can be implemented using software and/or hardware components. In this context, the terms "module" and "entity" used in this document, can correspond either to a software component or a hardware component or even a set of hardware and/or software components, capable to implement the function(s) outlined for the module or entity concerned.

FIG. 9 schematically shows an example of a simplified structure of a device 100 for sending a request for delivery of a multimedia data stream according to the invention. The device 100 implements the method for sending a request for delivery of multimedia data stream according to the invention which has just been described in relation to FIG. 3.

For example, the device 100 includes a processing unit 110, equipped with a processor µ1 and driven by a computer program Pg1 120, stored in a memory 130 and implementing the process according to the invention.

At initialisation, the code instructions of the computer program Pg1 120 are for example loaded into a RAM memory before being executed by the processor of the processing unit 110. The processor of the processing unit 110 implements the steps of the method described above, according to the instructions of the computer program 120.

In this embodiment of the invention, the device 100 includes at least one unit 111 for obtaining a description file of the data stream, a unit 112 for determining a size of sub-segment by link to access the network RT, a unit 113 partitioning a segment S into sub-segments based on the determined size, a unit 114 for transmitting a sub-request of a sub-segment on a link Li and a unit 115 for receiving the sub-segment SSn required.

Advantageously, the device 100 comprises a unit 116 for obtaining a structure of the data segment S, a unit 117 for measuring the status parameters of the network on the links L1, L2, L3, a unit 118 for selecting a representation of the segment S, a unit 119 for deciding to trigger an action when the sub-segment has not been received after a predetermined latency and a segment RECONST S for reconstructing of the segment S once all the sub-segments were received.

The device 100 further comprises a unit BD1 for storing the sub-segments received. This is for example a small buffer to firstly wait for the completeness of an arriving image and secondly to have a slight time buffer to ensure the timing of the decoding. In the implementation process, 40 ms are enough to induce a delay of 0 to 40 ms. An important issue concerns the reception of sub-segments by a device 100 integrated to the proxy described above, it endeavours to order the sub-segments for transmission to the customer DASH, but does not reconstitute the full image before transmitting it to the customer, which will inevitably increase the overall delay. These units are driven by the processor µ1 of the processing unit 110.

Advantageously, such a device 100 may be integrated to a customer terminal CT or a proxy module MP located upstream of a customer equipment according to the prior art. One advantage of such a proxy module is that it can implement the invention from a customer equipment already on the market, without the need to modify the operation of the customer equipment. The device 100 is then arranged to cooperate with at least the following modules of the customer terminal UE or of the proxy module MP:

a module E/R for transmitting/receiving data via queries are transmitted in the telecommunication network RT to the server equipment ES, such as various links L1, L2, L3 accessible at the customer equipment UE, such as a wired WAN access network or a wireless Wifi access network or still a 3G, 4G mobile network or a next generation of standard 3GPP;

a module DEC for decoding encoded data contained in the sub-segments received by the customer equipment UE or the proxy module MP.

The invention that has just been presented finds numerous applications involving the delivery of data, for example multimedia, with time constraints, up to real time applications. Indeed, on the customer's side, the method of processing a request for delivery according to the invention is capable of organising the delivery of data by optimising the bit rate and the available network resources while meeting a "time to live" target. By way of example, it could be used to implement an online voting service ("video-voting"), cloud gaming or even videoconferencing.

An exemplary embodiment of the invention improves the situation described above with respect to the prior art.

An exemplary embodiment in particular overcomes the shortcomings of the prior art described above.

Specifically, an exemplary embodiment of the invention provides a solution that delivers real-time multimedia data, that is to say with latency constraints close to those of conversational services, while retaining the benefits of adaptive streaming DASH technology, particularly in terms of deployment cost.

It goes without saying that the embodiments which have been described above have been given purely by an indicative and non-limiting way, and that many modifications can be easily made by those skilled in the art without departing from the scope of the invention.

The invention claimed is:

1. A method comprising:
processing a request for delivery of data sent by a customer terminal to a remote server equipment via a telecommunication network, said terminal being adapted to access said network through a plurality of links, each of the links providing a distinct access path between the terminal and the network according to a distinct access type, said data having been encoded in at least one stream with at least a predetermined bit rate, said stream having been previously cut into a plurality of segments, wherein processing comprises the following acts, implemented by at least one processing device for a segment of the at least one data stream:
determining at least one sub-segment size at least based on a number of the links and a size of the data stream to be delivered;
calculating a partitioning of the segment into sub-segments according to at least one set size and a distribution of the sub-segments over the plurality of links at least in accordance with a scheduling of the sub-segments in the partitioning calculated and a predetermined time constraint; and
sending a plurality of transmission requests of the sub-segments to the server over the plurality of links, at least according to the distribution calculated, a transmission request of a sub-segment over a link comprising an index of a sub-segment start, an index of a sub-segment end and at least one identifier of the segment.

2. The method for processing a request for the delivery of data according to claim 1, comprising an act of measuring parameters representative of a network state over the plurality of links, implemented upon receiving sub-segments from the server on said links in response to the transmission requests and an act of updating the acts of determining a sub-segment size per link and calculating a partitioning and a distribution of the sub-segments over the links according to the measured parameters.

3. The method for processing a request for the delivery of data according to claim 2, comprising an act of determining a frequency for transmitting the requests over a link according to the measured network parameters and wherein the transmission requests of the sub-segments over said link are sent at the determined transmission frequencies.

4. The method for processing a request for the delivery of data according to claim 1, comprising an act of obtaining an encoding structure comprising at least one piece of information representative of a type of data encoded in the segment associated with position information of the data of this type, an act of assigning a decoding priority level to the sub-segments of a segment according to the type information and to predetermined rules, and wherein the act of partitioning the segment into sub-segments and the act of distributing the sub-segments over the plurality of links also take into account the levels of decoding priorities assigned to the sub-segments.

5. The method for processing a request for the delivery of data according to claim 4, wherein the information representative of a type of data is obtained by sending a request for description of the segment to the server equipment and by receiving a description file of an encoding structure of the segment comprising said information.

6. The method for processing a request for the delivery of data according to claim 4, wherein the act of measuring network parameters comprises measuring a latency time between the sending of a transmission request of at least one sub-segment over a link and a reception of the requested sub-segment and wherein said method comprises, when a latency time is greater than a predetermined threshold for said request, a decision act triggering an action at least as a function of a priority level of decoding assigned to the requested sub-segment, said action belonging to a group consisting of:

retransmitting a new transmission request from the same sub-segment to another link; and
cancelling the current request.

7. The method for processing a request for the delivery of data according to claim 6, wherein the customer terminal and the server equipment are arranged to communicate according to a communication protocol with acknowledgment exchange, wherein when the action decided is a cancellation of the current request, the method comprises an act of transmitting an acknowledgment message to the server.

8. The method for processing a request for the delivery of data according to claim 5, wherein the received description file further comprises information representative of a data membership group and at least one first encoded data stream being available at a first bit rate and a second stream at a second bit rate, and wherein the method comprises an act of selecting a stream in which a sub-segment of a current segment can be requested, at least based on measured network parameters, the decoding priority level of the subset of the membership group of data of the sub-segment and the predetermined time constraint.

9. A device for processing a request for delivery of data sent by a customer terminal to a remote server equipment via a telecommunication network, said terminal being adapted to access said network through a plurality of links, each of the links providing a distinct access path between the terminal and the network according to a distinct access type, said data having been encoded in at least one stream with at least a predetermined bit rate, said stream having been previously cut into a plurality of segments, said device comprising:

a non-transitory computer-readable medium comprising instructions stored thereon;
a processor configured by the instructions to perform the following acts, implemented for a segment of said at least one data stream:
determining at least one sub-segment size at least based on a number of the links and a size of the data stream to be delivered;
calculating a partitioning of the segment into sub-segments according to at least one set size and a distribution of the sub-segments over the plurality of links at least in accordance with a scheduling of the sub-segments in the partitioning calculated and a predetermined time constraint; and
sending a plurality of transmission requests of the sub-segments to the server over the plurality of links, at least according to the distribution calculated, a transmission request of a sub-segment over a link comprising at least one identifier of the segment, an index of a sub-segment start and an index of a sub-segment end.

10. A customer terminal comprising the device for processing according to claim 9.

11. A proxy module arranged to cut off the customer terminal and the plurality of links to access the communications network, wherein the proxy module comprises the device for processing according to claim 9.

12. A non-transitory computer-readable recording medium, comprising a computer program stored thereon and having instructions for implementing a method for processing a request for delivery of data when executed by a processor, wherein the instructions configure the processor to perform acts comprising:

processing the request for delivery of data sent by a customer terminal to a remote server equipment via a telecommunication network, said terminal being adapted to access said network through the plurality of links, each of the links providing a distinct access path between the terminal and the network according to a distinct access type, said data having been encoded in at least one stream with at least a predetermined bit rate, said stream having been previously cut into a plurality of segments, wherein processing comprises the following acts, implemented for a segment of the at least one data stream:
determining at least one sub-segment size at least based on a number of the links and a size of the data stream to be delivered;
calculating a partitioning of the segment into sub-segments according to at least one set size and a distribution of the sub-segments over the plurality of links at least in accordance with a scheduling of the sub-segments in the partitioning calculated and a predetermined time constraint; and
sending a plurality of transmission requests of the sub-segments to the server over the plurality of links, at least according to the distribution calculated, a transmission request of a sub-segment over a link comprising at least one identifier of the segment, an index of a sub-segment start and an index of a sub-segment end.

* * * * *

UNITED STATES PATENT AND TRADEMARK OFFICE
CERTIFICATE OF CORRECTION

PATENT NO. : 10,536,503 B2
APPLICATION NO. : 15/527979
DATED : January 14, 2020
INVENTOR(S) : Patrice Houze Page 1 of 1

It is certified that error appears in the above-identified patent and that said Letters Patent is hereby corrected as shown below:

In the Claims

Column 20: Claim 12, Line 41:
Please delete "adapted to access said network through the plurality of"
And insert --adapted to access said network through a plurality of--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*